Figure 1:
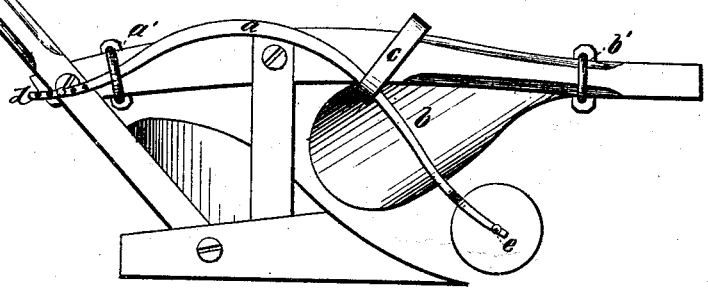

G. C. LYONS.
Colter.

No. 168,840.

Patented Oct. 19, 1875.

Witnesses.
W. R. Callicotte
James Keuner

Inventor.
Gilbert C. Lyons

UNITED STATES PATENT OFFICE.

GILBERT C. LYONS, OF CLARINDA, IOWA.

IMPROVEMENT IN COLTERS.

Specification forming part of Letters Patent No. 168,840, dated October 19, 1875; application filed June 12, 1875.

*To all whom it may concern:*

Be it known that I, GILBERT C. LYONS, of Clarinda, in the county of Page and State of Iowa, have invented a new and useful Improvement in Plow Attachments, the same being a combination of a rolling colter or cutter, attached to an adjustable spring-bar, with oblong guide-loop, clamp, and plow-beam, which improvement is fully set forth in the following specification, reference being had to the drawing accompanying the same.

Figure 2:
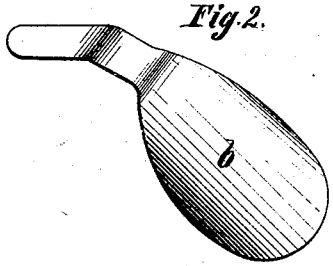
Figure 3:
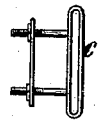

Figure 1 represents a plow with my improvement attached. Fig. 2 represents a fender, which may be attached to my plow-beam. Fig. 3 is a detail view of the guide-loop for the spring-bar, as shown at $c$, Fig. 1.

The object of my invention is to prevent the plow from rising out of the ground when objects are struck, and more easily to cover whatever may be upon the surface of the ground, and with which the plow may come in contact.

The rolling colter or cutter $e$, Fig. 1, is attached to the adjustable steel spring-bar $a$, which spring-bar is attached to the beam at the point $d$, where the handle on the land-side passes through the beam, and by the stirrup or clamp $a'$, just forward of the handle. It, therefore, has the spring of the bar $a$ from the point $e$, where the rolling colter is attached, to the point where the clamp $a'$ is attached. The colter $e$ is attached to the bar $a$ by being inserted between two forks of the bar, thus leaving a portion of the bar on each side of the colter. This spring-bar may be moved forward or backward, upward or downward, as occasion may require.

When solid objects are struck the spring of the bar $a$ allows the colter to rise over such objects, and the plow is not thrown out of the ground.

The spring-bar $a$ passes through the elliptical loop $c$, which is attached to the beam similar to $a'$, and may be moved forward or backward.

I claim as my invention—

A plow attachment consisting of the combination of the rolling colter $e$ and the adjustable spring-bar $a$, with oblong guide-loop $c$, clamp $a'$, and plow-beam, substantially as shown and described.

GILBERT C. LYONS.

Witnesses:
W. R. CALLICOTTE,
JAMES KEENEE.